United States Patent [19]
Miura et al.

[11] 3,903,137
[45] Sept. 2, 1975

[54] CHOLINE SULFONATE DERIVATIVES

[75] Inventors: Koji Miura, Kanazawa; Noboru Takagawa, Toyama; Yasuyuki Suzuki, Toyama; Yuji Matsumoto, Toyama, all of Japan

[73] Assignee: Toyama Chemical Co., Ltd., Tokyo, Japan

[22] Filed: May 31, 1974

[21] Appl. No.: 475,048

[30] Foreign Application Priority Data
June 12, 1973  Japan.............................. 48-65331
June 20, 1973  Japan.............................. 48-68724

[52] U.S. Cl. .......................... 260/484 A; 260/484 R
[51] Int. Cl.² ........................................ C07C 69/66
[58] Field of Search ................................. 260/484 A

[56] References Cited
FOREIGN PATENTS OR APPLICATIONS
1,336,350  7/1973  United Kingdom............. 260/484 A Primary Examiner—Anton H. Sutto
Assistant Examiner—P. J. Killos
Attorney, Agent, or Firm—Bierman and Bierman

[57] ABSTRACT

Choline sulfonate derivatives, characterized by the activating effect on digestive function and having stability against moisture, are produced by reacting α-alkanoyloxy-α-alkyl-acetic acid dimethylaminoethyl esters with methyl sulfonates.

11 Claims, No Drawings

CHOLINE SULFONATE DERIVATIVES

This invention relates to choline sulfonate derivatives and to a process for preparing them.

Heretofore Applicants found that the compounds of the following general formula (I) exhibit an activating effect on the digestive function. (Japanese Pat. Appln. Nos. 127605/70 and 79003/71; British Pat. No. 1,336,350; German Pat. Offen. 2,165,121). These compounds have the formula:

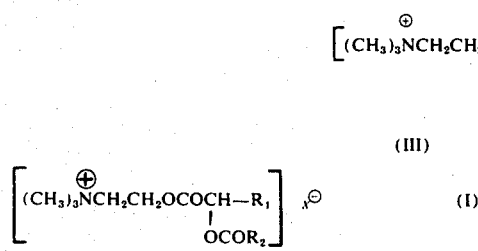
(I)

in which $R_1$ is lower alkyl, $R_2$ is methyl and X is halogen.

However, these compounds (I) are susceptible to decomposition due to moisture absorption. These compounds are found to be strongly hygroscopic whether in tablet form or other dosage forms.

As a result of additional research, it was found that novel choline compounds (II) could be obtained. These possess less hygroscopicity and increased stability when prepared in dosage form, as well as at least equivalent pharmacological effects when compared with the previous compound (I). These results are most surprising, especially in view of the fact that they are obtained merely by replacing the substituent X in compound (I).

An object of this invention is to provide a novel compound (II) possessing strong effects in activating digesting function.

Another object of this invention is to provide a novel and available compound (II) which possesses relatively low hygroscopicity.

A further object of this invention is to provide a process for preparing the novel compound (II) as described above.

Still another object of this invention is to provide a novel and valuable compound which does not decompose when prepared in dosage form.

Other objects of the present invention will become apparent from the specification and accompanying examples.

Briefly stated, the present invention comprises a novel choline sulfonate derivative of the formula (II):

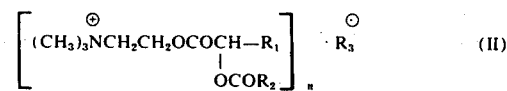
(II)

in which $R_1$ and $R_2$ are individually lower alkyl, $R_3$ is a sulfonate and $n$ is 1 or 2.

It has been found that the compounds of the present invention may be prepared by any one of the methods A, B and C described below.

Process A

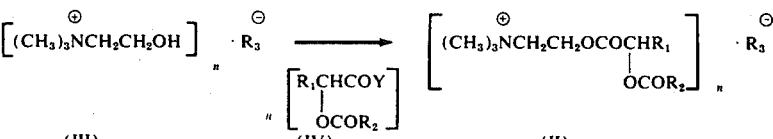

Y represents a reactive group as defined below and $R_1$, $R_2$, $R_3$ and $n$ are the same as defined above. Hence, the choline sulfonate derivatives (II) of the present invention are obtained by reacting choline sulfonates (III) with reactive derivatives (IV) of -alkanoyloxy--alkyl-acetic acid such as those exemplified below.

Process B

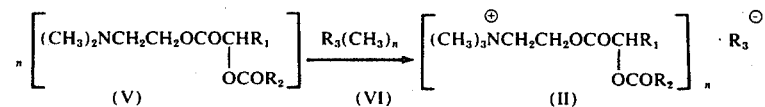

$R_1$, $R_2$, $R_3$ and $n$ are the same as defined above.

Hence, the choline sulfonate derivatives (II) of the present invention are obtained by reacting -alkanoyloxy--alkyl-acetic acid dimethylaminoethyl esters (V) with methyl sulfonates (VI).

Process C

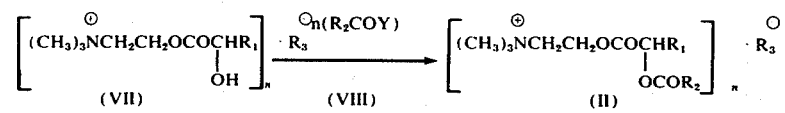

$R_1$, $R_2$, $R_3$, $n$ and Y are the same as defined above.

Hence, the choline sulfonate derivatives (II) of the present invention are obtained by reacting -hydroxy--alkyl-acetic acid trimethylammoniumethyl ester sulfonates (VII) with a reactive derivative (VIII) of a carboxylic acid. The symbols $R_1$ and $R_2$ of the compounds of formulas (II), (IV), (V), (VII) and (VIII) include lower alkyl, such as methyl, ethyl, propyl, butyl, pentyl and their isomers. The symbol $R_3$ of the compounds of the formulas (II), (III), (VI) and (VII) signifies mono-sulfonates or di-sulfonates. The mono-sulfonates include, for example, aryl sulfonates such as benzene sulfonate, toluene-2-sulfonate, toluene-4-sulfonate, naphthalene-1-sulfonate, naphthalene-2-sulfonate, camphor-3-sulfonate, camphor-8-sulfonate, camphor-10-sulfonate, and the like. The disulfonates include, for example, aryl di-sulfonates such as benzene-1,3-di-sulfonate, toluene-3,5-di-sulfonate, naphthalene-1,5-di-sulfonate, naphthalene-2,6-di-sulfonate, and naphthalene-2,7-di-sulfonate. The above aryl groups can be substituted by one or more of substituents such as nitro, alkyl, or halogen etc.

Suitable reactive derivatives corresponding to the compound of formula (IV) and (VIII) include, for example, acyl halides, acid anhydrides, or the mixed acid anhydrides with another acid such as toluene-4-sulfonic acid, or ethyl chlorocarbonate. Hence the term Y as used above represents an acyl substituent which would be reactive with the 1-ethyl hydroxy group of compounds (III) or the -hydroxy group of compound (VII), thus forming the compound (II) of the present invention. Such acyl substituents are well recognized in the art and include such acyl substituents as halide, anhydride, and other acyl substituents such as p-toluene sulfonate and ethylchlorocarbonate.

Moreover, the choline sulfonate derivatives of the compound of formula (III) to be used as the starting material of method A is easily obtained by reacting dimethylaminoethanol with methyl sulfonates (VI).

Additionally, the -alkanoyloxy--alkyl-acetic acid dimethylaminoethyl ester of the compound of formula (V) to be used as the starting material of method B is easily obtained by reacting dimethylaminoethanol with -alkanoyloxy--alkylacetyl halides.

Additionally, the hydroxy--alkyl-acetic acid trimethylammoniumethyl ester sulfonate corresponding to the compound of formula (VII) is easily obtained by reacting -hydroxy--alkyl-acetic acid dimethylaminoethyl esters with methyl sulfonates (VI).

The present invention comprises providing a novel compound possessing strong effects for activating the digesting function as well as less hygroscopicity than the known choline compounds and an improved preparation of the compound of formula (II).

In carrying out process A, the compounds of formulas (III) and (IV) are reacted in an inert solvent while heating. Alternatively, the compound of the formula (III) is dissolved in an excess amount of the compound of the formula (IV) and reacted at elevated temperatures.

Examples of inert solvents to be employed in the present invention are chloroform, dioxane, acetone, and acetonitrile. Reaction temperatures of from about 50C to 100C are suitable, as are reaction times of about 2 to 5 hours. After the completion of the reaction, the reaction mixture is allowed to stand at room temperature in order to permit crystallization to occur. Thus, the desired product (II) is obtained in the form of crystals by filtration or other separation means.

In carrying out process B, the compounds of formulas (V) and (VI) are mixed and reacted in the presence or absence of an inert solvent. As an inert solvent, for example, it is preferred to use ethers, ketones, alcohols, and hydrocarbons and the reaction is conducted at a temperature in the range of about 20 to 100C for about 1 to 2 hours. When the reaction is complete, the reaction mixture is allowed to stand at room temperature to permit crystallization of the product. The product crystals are recovered by filtration of the deposited crystals or by other conventional separation means.

In addition to the above, in carrying out process C, the compounds of formulas (VII) and (VIII), are dissolved in the presence of the inert solvent, or the compound of the formula (VII) is dissolved in a stoichiometric excess amount of the compound of formula (VIII) and is reacted to form the product (II). Alternatively, an organic base such as pyridine or triethyl amine can be added. As inert solvents, chloroform, dioxane, acetone, acetonitrile and the like are preferred. The preferred temperature range is about 50 to 100C. After the reaction, the reaction mixture is allowed to stand at room temperature in order to permit crystallization of the product.

When the reaction is conducted using an excess amount of the compound of the formula (VIII), after completion of the reaction, diethylether is added to the reaction mixture and excess amounts of the compound of the formula (VIII) and by-products formed in the reaction are thus extracted.

After extraction the residual solution is allowed to stand while cooling. Crystals of the desired product (II) then separate out. Thus, pure crystals of the desired product (II) are obtained and are separated by filtration or other recognized means.

The product (II) which is obtained by methods A, B or C of the present invention is of a high purity. Even higher purities are obtainable by recrystallization from solvents such as acetone or ethyl alcohol or mixtures of such solvents.

Additionally, in carrying out the processes A, B, and C of the present invention, it should be understood that the preferred reaction conditions and the manner of posttreatment are not limited by the foregoing descriptions. Hence, optimization of these parameters can easily be determined by a person of reasonable skill with respect to the particular reagents and solvents employed.

According to the present invention, it is now possible to obtain the novel compounds of the formula (II) possessing the aforesaid advantages and to prepare them.

The pharmacological effect, toxicity and stability [appearance, hygroscopic property and rate of decomposition] of the products (II) of the present invention will now be described as follows:

A. Activity of mice- isolated ileum and hygroscopic properties:

Table I

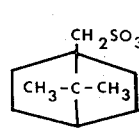

| No. | $R_1$ | $R_2$ | $R_3$ | n | Activity on mice isolated ileum [1] | Hygroscopic property [2] Exterior | Rate of moisture absorption |
|---|---|---|---|---|---|---|---|
| 1.[3] | $CH_3$ | $CH_3$ | Cl | 1 | ++++ | deliquescence | 20.0% |
| 2. | $CH_3$ | $CH_3$ | [CH$_3$-C-CH$_3$ with CH$_2$SO$_3$]=O | 1 | +++ +++ | partial deliquescence | 5.0% |

Table I-continued $$\left[ (CH_3)_3\overset{\oplus}{N}CH_2CHOCOCHR_1 \atop OCOR_2 \right]_n \cdot R_3^{\ominus}$$

| | Specific Variables | | | | Activity on mice isolated ileum[1] | Hygroscopic property[2] | |
|---|---|---|---|---|---|---|---|
| | | | | | | Exterior | Rate of moisture absorption |
| No. | R₁ | R₂ | R₃ | n | | | |
| 3. | CH₃ | CH₃ |  | 1 | ++++ | stability | 0.2% |
| 4. | CH₃ | CH₃ |  | 1 | ++++ | | 0.1% |
| 5. | CH₃ | CH₃ |  | 1 | +++ | | 0.4% |
| 6. | CH₃ | CH₃ | 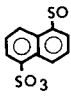 | 2 | ++++ | | 0.07% |
| 7. | CH₃ | CH₃ |  | 2 | ++++ | | 0.7% |
| 8. | CH₃ | C₂H₅ |  | 1 | ++++ | | 0.5% |
| 9. | CH₃ | C₃H₇ |  | 1 | +++ | | 0.6% |
| 10. | CH₃ | C₂H₅ |  | 2 | ++++ | | 0.3% |

[1]The contractive ratio in a concentration of 1 ¼ 10⁻⁵ g/ml of each drug. A ratio of 100% is deemed to be the ileum contraction from 1 ¼ 10⁻⁷ g/ml of acetylcholine chloride,
  10 – 30 % +
  30 – 50 % ++
  50 – 80 % +++
  80 – 100 % ++++
[2]The variation in weight after standing for 24 hours at a moisture of 80%, relative humidity at 18C.
[3]-acetoxy--methyl acetylcholine chloride B. Activity on mice-isolated ileum and stimulous action of small intestine and stomach of guinea pig in vivo.

Table II

| Drug No. | Activity on mice isolated ileum* [ED₅₀ (M) ] | Stimulous action of the small intestine of guinea pig in vivo** [mg/kg(P.O.) ] | Stimulous action of stomach of guinea pig in vivo*** [mg/kg(P.O.)] |
|---|---|---|---|
| Ach**** | — | 150 non-effective | 150 non-effective |
| 1 | 1.06 ¼ 10⁻⁵ | 150 effective | 150 efficacy |
| 4 | 1.40 ¼ 10⁻⁵ | 150 effective | 150 efficacy |

Table II-continued

| Drug No. | Activity on mice isolated ileum* [ED$_{50}$ (M)] | Stimulous action of the small intestine of guinea pig in vivo** [mg/kg(P.O.)] | Stimulous action of stomach of guinea pig in vivo*** [mg/kg(P.O.)] |
| --- | --- | --- | --- |
| 6 | 1.57 ¼ 10$^{-5}$ | 150 effective | 150 efficacy |

*Measured by Magnus Method Pflügers Arch. Ges. Physiol. 102, 349-363 (1904) Calculated by Comparison with the contract of Ach at 1 ¼ 10 $^7$ g/ml concentration as 100%.
**Measured by Trendelenburg Method Z. Biol. 61 67 (1913)
***Measured by Ballon technique Carlson, A.J. (1916); The control of hunger in health and disease. The Univ. of Chicago Press, Chicago.
****Ach= acetylcholine chloride C. Action to a charcoal passage in gastrointestinal motility of mice and mice acute toxicity.

Table III

| Drug No. | Action of propulsion of a charcoal meal* [mg/kg(S.C.)] | Mice acute toxicity LD$_{50}$g/kg(P.O.) | LD$_{50}$mg/kg(S.C.) |
| --- | --- | --- | --- |
| Ach | 30 | 110% | 3 | 170 |
| 1 | 20 | 120% | 6.8 | 576 |
| 4 | 20 | 115% | 10 | 625 |
| 6 | 20 | 114% | 15 | 826 |

*Drugs were administered (S.C.) to mice which starved for 17 hrs. After 20 minutes, charcoal suspension was administered and after an additional 20 minutes, intestine was isolated. Ratio of charcoal transferred length to total length of intestine (from Pylorus to Anus) were calculated as compared with a control group which was not administered with the present invention. (Control = 100%)

D. Rates of moisture absorption and decomposition. Table IV shows exterior appearances, rate of moisture absorption and decomposition in each drug after being kept at 35C, moisture 55% for 10 days.

Table IV

| Drug No. | | *Rate of moisture absorption | **Rate of decomposition |
| --- | --- | --- | --- |
| 1 | deliquescence | 30.0 % | 25.0 % |
| 4 | stability | 0.6 % | 0.5 % |
| 6 | stability | 0.1 % | 0.2 % |

*Rate of moisture absorption (%) = $\frac{\text{Increase in weight}}{\text{Weight before absorption}} \times 100$

**Rate of decomposition by method of hydroxylamine of ester (Hestrin S., J. Biol. Chem. 180 249 (1949)
Rate of Decomposition (%) =
$$\left[1 - \frac{\text{Absorbance of sample}}{\text{Absorbance of standard solution}}\right] \times 100$$

It is clear from the above Tables (I) to (IV) that the compounds of the present invention possess excellent stimulating activity in dilute solutions of about 10$^{-5}$ mole concentration. Even if the administered amount is less than the effective amount of Ach, the compounds (II) show sufficient effects on both the small intestine and stomach. Moreover, the action of compounds (II) in the propulsion of a charcoal meal is much greater than Ach. The acute toxicity of the compounds (II) is extremely weak when compared with Ach.

Additionally, -acetoxy--methyl acetylcholine chloride (NO. 1), which was previously developed by the present inventors, shows deliquescence and partial decomposition, whereas the compounds (II) show little deliquescence and are stable. Accordingly, the compounds of this invention activate the digesting function and have enhanced stability and low hygroscopic properties.

The following examples are given to more fully illustrate the present invention. The examples are for illustrative purposes only and are not meant to limit the invention in any way.

EXAMPLE 1

Preparation of -acetoxy--methyl acetic acid trimethylammoniumethyl ester benzene sulfonate 3g of choline benzene sulfonate (obtained by reacting methyl benzenesulfonate with dimethyl amino ethanol) was suspended in 15 ml of acetone. To this suspension 3.7g of lactic acid anhydride diacetate was added and the mixture solution refluxed for 4 hours. After the reaction, the reaction mixture was cooled. 8 ml of diethyl ether was added and was allowed to stand overnight whereupon crystals separated out. The crystals were collected by filtration and 3.7g (86% yield) of the product having a melting point of 96 to 99C were obtained.

EXAMPLE 2

Preparation of -acetoxy--methyl acetic acid trimethylammoniumethyl ester toluene-4-sulfonate 3g of choline-toluene-4-sulfonate (obtained by reacting methyl p-toluene sulfonate with dimethylamino ethanol) were suspended in 15 ml of acetone. 4g of the mixed acid anhydride obtained by reacting acetyl-lactic acid with ethylchlorocarbonate was added to the suspension and the mixture was refluxed for 3 hours. After the reaction, the resultant solution was cooled to room temperature. The solvent was removed under reduced pressure and the precipitated crystals were collected by filtration. 3.1g (75% yield) of product having a melting point of 106 to 109C were obtained. These crystals were recrystallized from acetone, yielding purified crystals having a melting point of 108 to 110C.

EXAMPLE 3

Preparation for -acetoxy--methyl acetic acid trimethylammoniumethyl ester-DL-camphor-10-sulfonate 3.3g of choline-DL-camphor-10-sulfonate were suspended in 10 ml of acetone. To the suspension 3.8 g of lactic acid anhydride diacetate were added and the mixture was refluxed for 3 hours. The reaction mixture was then cooled to room temperature. The solvent was removed under reduced pressure. Subsequently 8 ml of ethyl acetate were added and allowed to stand overnight whereupon product crystals separated out. The separated crystals were collected by filtration.

3.5 g (78% yield) of product having a melting point of 153 to 156C were obtained.

EXAMPLE 4

Preparation of Bis [-acetoxy--methyl acetic acid trimethylammoniumethyl ester]-naphthalene-1,5-disulfonate 5.2g of bis(choline)-naphthalene-1,5-disulfonate was suspended in 30 ml of acetonitrile, and 10 g of lactic acid anhydride diacetate was added thereto. This mixture was refluxed for 3 hours. The resulting reaction mixture was allowed to stand at room temperature while cooling to precipitate the desired product crystals, which were collected by filtration. 5.5 g (76% yield) of the desired product having a melting point of 189 to 191C were obtained.

EXAMPLE 5

Preparation of -butyryloxy--methyl acetic acid trimethylammoniumethyl ester toluene-4-sulfonate 3 g of choline-toluene-4-sulfonate were suspended in 8 ml of dioxane. 2g of butyryl lactoyl chloride were added to the suspension and reacted for 2 hours at 80C. After the reaction, the reaction solution was cooled to room temperature and the solvent removed under reduced pressure. To the residue thus obtained, 8 ml of diethyl ether was added and the mixture was allowed to stand overnight to precipitate product crystals. 3.3 g (72% yield) of the desired product having a melting point of 91 to 94C were obtained.

EXAMPLE 6

Preparation of -acetoxy--methyl acetic acid trimethylammoniumethyl ester toluene-4-sulfonate 3 g of choline-p-toluene sulfonate were suspended in 10 ml of acetone and the mixed acid anhydride obtained from 1.5 g of acetyl lactic acid, 2.2 g of p-toluene sulfonyl chloride and 1.5 g of triethyl amine was added thereto and reacted for 1 hour at 50 to 60C. Subsequently, 30 ml of diethylether were added to the reaction mixture in order to dissolve the soluble substances. The ether layer was removed to obtain the oily residue. The oily residue was allowed to stand overnight at room temperature in order to form product crystals. 2.5 g (61% yield) of high purity product having a melting point of 109 to 110C was obtained by recrystallizing the product crystals from acetone.

EXAMPLE 7

Preparation of -acetoxy--methyl acetic acid trimethylammoniumethyl ester benzenesulfonate 5 g of -acetoxy--methylacetic acid dimethylamino ethyl ester were dissolved in 20 ml of acetone, and 4.3 g of methyl benzene sulfonate were added thereto. The reaction was exothermic. The reaction mixture was cooled to room temperature and the precipitated crystals were collected by filtration. 8.8 g (95% yield) of the desired product having a melting point of 100 to 103C were obtained.

EXAMPLE 8

Preparation of -acetoxy--methylacetic acid trimethylammoniumethyl ester toluene-4-sulfonate 20 g of -acetoxy--methylacetic acid dimethylaminoethyl ester were dissolved in 30 ml of acetone. 19 g of methyl-p-toluene sulfonate were gradually added thereto while cooling. The reaction was exothermic. The resultant reaction mixture was allowed to stand for cooling so as to precipitate product crystals. 3.6 g (90% yield) of the desired product having a melting point of 108 to 110C were obtained by filtration. Recrystallization from acetone yielded product crystals melting at 109 – 110C.

EXAMPLE 9

Preparation of -acetoxy--methylacetic acid trimethylammoniumethyl ester-DL-camphor-10-sulfonate 5 g of methyl-DL-camphor-10-sulfonate were dissolved in 20 ml of ethylacetate, and 4 g of -acetoxy--methyl acetic acid dimethylaminoethyl ester were added thereto and reacted at 50 to 60C for 10 minutes. After the reaction, the solution was allowed to cool whereupon product crystals precipitated. 7.5 g (85% yield) of the desired product having a melting point of 153 to 156C were obtained by filtering the deposited crystals.

EXAMPLE 10

Preparation of -acetoxy--methyl acetic acid trimethylammoniumethyl ester naphthalene-2-sulfonate 2.2 g of methyl-naphthalene-2-sulfonate were dissolved in 10 ml of ethyl acetate and 2 g of -acetoxy--methyl-acetic acid dimethylaminoethyl ester were added thereto and reacted at 50 to 60C for 10 minutes. After the reaction, the reaction solution was allowed to cool so as to precipitate product crystals. Filtration yielded 3.1 g (70%) of the desired product having a melting point of 90 to 96C. Recrystallization from ethyl acetate yielded pure product having a melting point of 94 to 97C.

EXAMPLE 11

Preparation of Bis[-acetoxy--methyl-acetic acid trimethylammoniumethyl ester]-naphthalene-1,5-disulfonate 5 g of methyl-naphthalene-1,5-disulfonate were suspended in 40 ml of acetonitrile and 6.5 g of -acetoxy--methyl-acetic acid dimethylaminoethyl ester was added thereto. The solution was heated for 30 minutes at 50 to 55C. After the reaction, the mixture was allowed to cool so as to precipitate product crystals. Filtration yielded 10 g (87%) of the desired product having a melting point of 189 to 191C.

EXAMPLE 12

Preparation of Bis[-acetoxy--methyl-acetic acid trimethylammoniumethyl ester]-naphthalene-2,6-disulfonate.

5 g of methyl-naphthalene-2,6-disulfonate were suspended in 40 ml of acetonitrile, and 6.5 g of -acetoxy--methyl-acetic acid dimethylaminoethyl ester was added thereto. Subsequently the reaction and post-treatment were conducted under the same conditions of example 6, and 10.5 g (91%) of the desired product having a melting point of 227 to 230C were obtained. When this was recrystallized from methyl alcohol, there was obtained a pure product having a melting point of 228 to 230C.

EXAMPLE 13

Preparation of Bis[-propionyloxy--methyl-acetic acid trimethylammoniumethyl ester]-naphthalene-1,5-disulfonate 3g of methyl-naphthalene-1,5-disulfonate were suspended in 20 ml of ethyl alcohol, and 4 g of -propionyloxy--methyl-acetic acid dimethylaminoethyl ester was added thereto. The ensuing reaction proceded for 30 minutes at 40 to 50C, and then 10 ml of ether were added. The reaction solution was allowed to stand overnight to precipitate product crystals. 5.8 g (85% yield) of the desired product having a melting point of 120 to 123C were obtained by filtering off the precipitated crystals.

EXAMPLE 14

Preparation of -propionyloxy--methyl-acetic acid timethylammoniumethyl ester toluene-4-sulfonate To 5 g of -hydroxy--methyl-acetic acid trimethylammoniumethylester toluene-4-sulfonate having a melting point of 106 to 108C. (obtained by reacting dimethyl amino ethyl lactate with methyltoluene-4-sulfonate) was added 15 ml of propionic anhydride and 1 ml of pyridine. This mixture was reacted at 100C for 3 hours. After the reaction, the reaction solution was allowed to cool. Subsequently 30 ml of diethyl ether were added in order to extract the impurities from the reaction solution. The ether layer was removed, leaving an oily residue. The thus obtained oily residue was allowed to stand overnight at about 0C in order to obtain 4.8 g (83% yield) of crude product having a melting point of 84 to 88C. When this was recrystallized from ethyl acetate, the purified crystals melted at 87 to 90C.

EXAMPLE 15

Preparation of -butyryloxy--methyl-acetic acid trimethylammoniumethyl ester toluene-4-sulfonate To 5 g of -hydroxy--methyl-acetic acid trimethylammoniumethyl ester toluene-4-sulfonate was added 15 ml of butyric anhydride and 1 ml of pyridine. Subsequently the reaction and post-treatment were conducted under the same conditions as in example 8, and there was obtained 4.7 g (79%) of the desired product having a melting point of 95 to 97C.

What is claimed is:

1. A choline sulfonate derivative of the formula

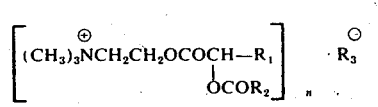

in which $R_1$ and $R_2$, individually, are lower alkyl, $R_3$ is aryl sulfonate, camphor sulfonate, or aryl di-sulfonate and $n$ is 1 or 2.

2. The choline sulfonate derivative of claim 1 in which $R_3$ is benzene sulfonate, toluene sulfonate, naphthalene sulfonate, or naphthalene di-sulfonate.

3. The derivative of claim 1 in which $R_1$ and $R_2$ are methyl, $R_3$ is benzene sulfonate and $n$ is 1.

4. The derivative of claim 3 in which $R_3$ is p-toluene sulfonate.

5. The derivative of claim 3 in which $R_3$ is camphor-10-sulfonate.

6. The derivative of claim 3 in which $R_3$ is naphthalene-2-sulfonate.

7. The derivative of claim 3 in which $R_3$ is naphthalene-1,5-disulfonate and $n$ is 2.

8. The derivative of claim 3 in which $R_3$ is naphthalene-2,6-disulfonate and $n$ is 2.

9. The derivative of claim 1 in which $R_1$ is ethyl, $R_2$ is methyl, $R_3$ is naphthalene-1,5-disulfonate and $n$ is 2.

10. The derivative of claim 9 in which $R_3$ is p-toluene sulfonate and $n$ is 1.

11. The derivative of claim 4 in which $R_2$ is propyl.

* * * * *